Figure 1:
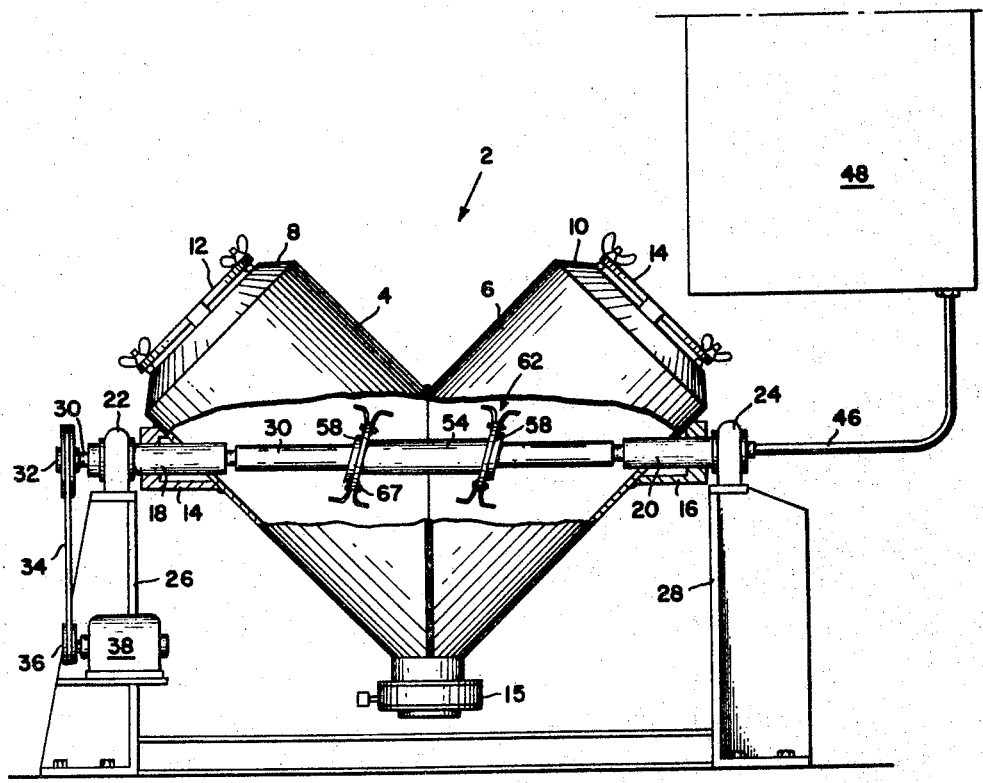

April 6, 1965  W. R. CALVERT  3,177,151

PROCESS FOR PRODUCING SPHERICAL CATALYST PELLETS

Filed Jan. 10, 1961

INVENTOR.
WILLARD R. CALVERT
BY

ATTORNEYS

United States Patent Office 3,177,151
Patented Apr. 6, 1965

3,177,151
PROCESS FOR PRODUCING SPHERICAL
CATALYST PELLETS
Willard R. Calvert, Ridley Park, Pa., assignor to Oxy-Catalyst, Inc., Berwyn, Pa., a corporation of Pennsylvania
Filed Jan. 10, 1961, Ser. No. 81,885
7 Claims. (Cl. 252—435)

This invention relates broadly to the field of catalyst structures and, more particularly, relates to the method of forming a catalyst base and a catalyst method.

The broad object of this invention is to provide a catalyst in the form of a ball or substantially spherical pellets of a diameter of from about .020" to about .100", preferably from about .030" to about .050". As used herein the term "diameter" is intended to mean the dimension established by sieve testing. Such a catalyst has numerous applications but is of particular importance in exhaust purifiers for gasoline engines where a free flowing catalyst of small dimensions is markedly advantageous. It is a further object of this invention to provide such a catalyst which is strong and hard and which has good resistance to mechanical attrition.

In order to make such a catalyst commercially practicable, it is important that it be produced at relatively low cost as contrasted to the normally employed method of producing small catalysts by extrusion. It is therefore, an additional object of this invention to provide a method of producing such catalysts which can be carried out on a large scale at relatively low cost.

In accordance with the method of this invention, a predetermined amount of a phosphoric acid solution is sprayed gradually into a flowing mass, advantageously a tumbling mass, of alumina trihydrate powder. The droplets of the sprayed phosphoric acid solution form a nucleus for the wetting and binding together of particles of the alumina trihydrate powder into discrete aggregates reacting with the $Al(OH)_3$ to form $Al(H_2PO_4)_3$. The thus formed aggregates are rolled or tumbled to make them substantially spherical in shape. As the aggregates are further wetted, their size is increased by picking up additional powder. After all of the phosphoric acid solution has been sprayed in, the pellets are quenched by dusting with a powder to facilitate separation of the pellets.

The thus formed pellets are heated at a temperature of from ambient to about 212° F. for a period sufficient to complete the reaction of additional alumina hydrate with the previously formed $Al(H_2PO_4)_3$ to form $AlPO_4$ which binds together the remaining particles of $Al(OH)_3$ into hard pellets. After the pellets have been thus hardened, they are sieved to separate out of the mass those of a predetermined size in the range of from about .22" to about .11" and preferably of from about 0.033" to about .055" in diameter. It is to be noted that the diameters of the pellets at this state are somewhat greater than the diameters of the desired end product pellets since on being calcined they shrink somewhat and shrink slightly more when impregnated with a catalyst metal solution and converted into catalyst. Thus a diameter about 10% larger than is desired is selected at this stage of the process.

The desired pellets which have been separated out are then made catalytically active by subjecting them to heating preferably at a temperature of from about 800° F. to about 1200° F. to decompose the $Al(OH)_3$ to a mixture of $AlO(OH)$ and $Al_2O_3$ until the pellets can absorb a minimum of 100 gms. of $H_2O$ per pound of pellets. A period of one hour normally is sufficient. This step completes the formation of the pellet base containing an aluminum phosphate binder.

The alumina trihydrate onto which is sprayed the phosphoric acid solution is a mixture of relatively high surface to mass ratio particles of alumina trihydrate having an average surface particle diameter of less than one micron, advantageously greater thn 0.01 micron, and preferably about 0.08 micron, and relatively low surface to mass ratio particles of alumina trihydrate having an average surface particle diameter in the range of from about 10 microns to about 100 microns, preferably from about 20 microns to about 40 microns, the first-mentioned alumina trihydrate being from about 5% to about 20% by weight of the alumina trihydrate mixture. It is preferred to use from about 9% to about 15% of the first-mentioned alumina trihydrate by weight of the alumina trihydrate mixture. Any alumina trihydrate having an equivalent particle size distribution or dissolving characteristics similar to the above described mixture will be satisfactory. It will of course be understood that the term "mixture" is not intended necessarily to connote that two separately prepared batches of $Al(OH)_3$ are prepared and then mixed since it is possible to initially prepare $Al(OH)_3$ having the described particle size distribution.

"Average surface particle diameter" is a well-known surface measurement for very small particles. By the use of photomicrographs, the true diameters of a large number of particles in a field can be measured. If the surface of each particle is calculated from the diameter (assuming spherical particles) and the sum of these surfaces is divided by the number of particles, an average surface is obtained. The diameter corresponding to this average surface is known as the average surface particle diameter.

It is most convenient to make a mixture from forms of alumina trihydrate which are well-known and readily available commercially. For the first-mentioned alumina trihydrate it is satisfactory to employ Alcoa hydrated-alumina C730 having an average surface particle diameter of 0.08 micron and a bulk density loose of 16 to 21 lbs./ft.³, while for the second-mentioned form, Alcoa hydrated-alumina C31 having a screen analysis specified as follows:

| | Percent |
|---|---|
| On 325 mesh | 20–40 |
| Through 325 mesh | 60–80 | and having an average surface particle diameter of 30 microns is satisfactory.

The phosphoric acid in the phosphoric acid solution will be employed in an amount of from about 5.7% to about 14.3% by weight of the total weight of the alumina trihydrate mixture. Advantageously, the phosphoric acid in the phosphoric acid solution will be employed in an amount of from about 9.1% to 10.9% by weight of the alumina trihydrate mixture. The solution will be an aqueous solution in which the phosphoric acid will be present in an amount of from about 18% to 72% preferably 35% to 52% by weight of the solution.

While a phosphoric acid aqueous solution is satisfactory, it has been found unexpectedly that a phosphoric acid solution into which a portion of the alumina trihydrate has been dissolved is highly advantageous. Either of the aforementioned alumina trihydrates or a mixture thereof can be premixed with the phosphoric acid solution. It is preferred and entirely satisfactory to employ the alumina trihydrate having the larger particle size since it is less expensive. The alumina trihydrate reacts with the phosphoric acid to form monoaluminum dihydrogen phosphate $Al(H_2PO_4)_3$ which with the water, gives a viscous, syrupy solution at room temperature. While the employment of the alumina trihydrate in the phosphoric acid solution in any amount sufficient to increase the viscosity of the solution is advantageous, i.e. up to a stoichiometric amount of alumina trihydrate, it is preferred to employ a stoichiometric amount of alumina trihydrate in order to react all of the phosphoric acid. Advantageously the acid solution is returned to about room temperature after the dissolving of the alumina trihydrate before it is employed.

When the aluminum dihydrogen phosphate is in the solution sprayed on the alumina trihydrate, it is converted to the desired aluminum phosphate binder when the pellets are heated. When phosphoric acid is sprayed onto the pellets, the aluminum dihydrogen phosphate is formed and then converted to aluminum phosphate on heating.

In addition to advantages apparently attributable to the viscosity of the solution, a marked advantage is achieved by the pre-reaction of the phosphoric acid since the subsequent spraying operation is then independent of the phosphoric acid reaction which introduces a variable difficult to control in practice due to the interrelationship of the reaction rate and mass temperature. This procedure has been found to be markedly advantageous in the production of a larger mass of pellets within the desired narrow size range.

The quenching powder may be, for example, either one or a mixture of the alumina trihydrates. The employment of the larger particle size alumina trihydrate has been found to be satisfactory and is preferred due to its lower cost.

The thus formed catalyst base pellets which are substantially spherical and have a diameter of from about .020″ to about .100″, preferably from about .030″ to about .050″ will contain from about 10% to about 25% aluminum phosphate ($AlPO_4$) by weight, advantageously from about 16% to about 19% of aluminum phosphate by weight, with the remainder being catalytic aluminum oxides. The aluminum phosphate acts as a binder.

APPARATUS FOR CARRYING OUT THE FOREGOING STEPS

Figure 2:
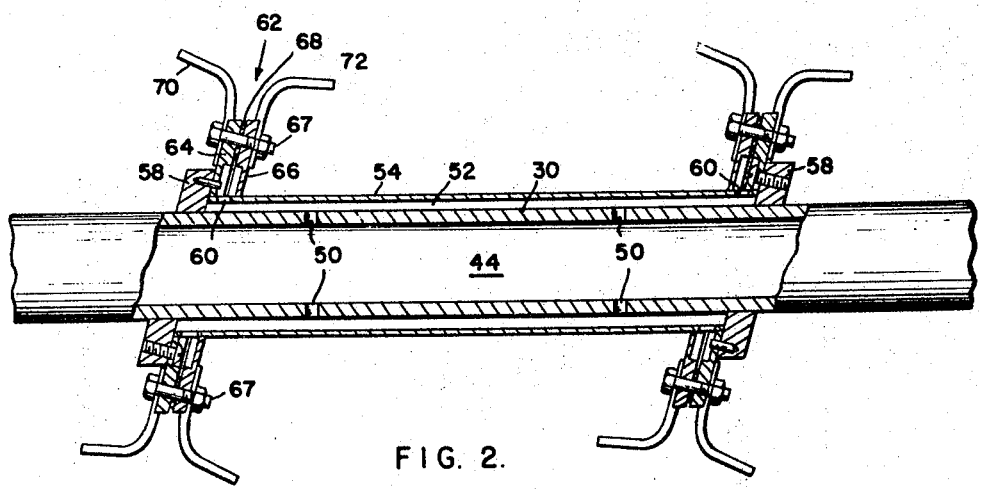

Apparatus for carrying out the foregoing steps which is typical of apparatus available commercially which can be employed is shown in the drawings in which:

FIGURE 1 is a front elevation of a blending apparatus suitable for carrying out the above described method steps; and FIGURE 2 is a detailed view of the liquid spraying and intensifier portion of the apparatus of FIGURE 1 partially broken away.

As shown in FIGURE 1 blending apparatus 2 comprises a container having opposite side leg portions 4 and 6, the ends of which are closed by plates 8 and 10, respectively which in turn are provided with removable covers 12 and 14, respectively. A valve controlled discharge nozzle 15 is also provided.

Leg portions 4 and 6 have secured thereto mounting brackets 14 and 16, respectively, which in turn are secured to stub shafts 18 and 20 which are respectively mounted for rotation in trunnion bearings 22 and 24 supported by pedestals 26 and 28. Stub shafts 18 and 20 are fixedly secured to shaft 30 which is driven by a pulley 32 which in turn is driven by belt 34 mounted on a pulley 36 which is driven by a motor 38. The operation of motor 38 causes the bodily rotation of leg portions 4 and 6 about the axis of shaft 30.

Shaft 30 has a hollow central portion 44 to which is freely connected a liquid supply line 46 which in turn is connected to a liquid supply tank 48. Liquid supplied to the portion 44 passes through opening 50 in shaft 30 to a reservoir 52 formed by sleeve 54 and end plates 56 and 58 which are secured to shaft 30. The liquid is free to pass through openings 60 in sleeve 54 to the hollow interior of nozzle 62 which are formed by a pair of plates 64 and 66 secured together by bolt means indicated at 67. Spacer washers 68 surrounding each bolt means 67 provides a separation between plates 64 and 66 through which the liquid is sprayed outwardly. Intensifier arms 70 and 72 are secured to plates 64 and 66 by bolt means 67.

The alumina trihydrate powder is placed within leg portions 4 and 6 and shaft 30 is rotated to rotate these leg portions. The phosphoric acid solution contained in tank 48 passes through line 46 to the interior portion 44 of shaft 30 and thence to nozzles 62 which spray it outwardly into the powder which is maintained as a flowing tumbling mass by the rotation of the apparatus. After the discreet aggregates are formed as described above, they are discharged through discharge spout 15.

OXIDATION CATALYST

An excellent oxidation catalyst can be formed from the activated oxide pellets by impregnating the pellets with a catalytically active metal capable, in conjunction with the metal oxide, of catalyzing substantially complete oxidation reactions of, for example, exhaust gases from the combustion of leaded gasoline. Suitable metals for this purpose include, preferably, platinum, palladium, silver and copper or combinations of these metals such as, for example, silver-chromium, copper-chromium and copper-manganese. Iron, cobalt, vanadium and nickel are also suitable. The above metals may exist in the catalyst initially or during use either in the metallic state or in an oxidized condition, and it is understood that the term "catalytically active metal" is intended to include the metal in either or both the reduced or oxidized state.

The impregnation of the pellets with the catalytically active metal may be accomplished by methods well known in the art. One method is, for example, to soak the pellets in a solution of a salt of the appropriate metal, preferably formed with a strong acid, such as a nitrate, sulfate or chloride salt, using care to displace trapped air so that all of the pellets will be wet with the solution. The solution which is not absorbed is drained off. The thus soaked pellets are dried in an oven in which they are exposed to a stream of air and a reducing gas such as hydrogen at a temperature in the range of from about 400° F. to about 1,000° F., advantageously about 800° F., to reduce the catalyst metal. Advantageously the total weight of metal in the catalyst base will be from about 0.03% to about 15% by weight of the impregnated base. Advantageously, when using platinum, the range of the platinum will be 0.03% to 1%, while for the other catalyst metals it is advantageous to use 1% to 15% by weight of the impregnated base.

While the prior art methods of impregnation can be employed, it has been found highly advantageous to employ a novel method in which the solution of a salt of the appropriate metal is sprayed onto the catalyst base pellets while they are being rotated or tumbled in, for example, the previously described apparatus. It is satisfactory to gradually spray on from about 75% to about 95% of the total weight of the solution which can be absorbed by the pellets (as determined, for example, by means of a soaking test). Spraying the solution of the catalyst metal salts in this manner eliminates the preferential absorption of one metal salt from a mixture of more than one, as is inherent in the previously used soaking technique which made it impossible to accurately control the amount of metals on or in the catalyst base pellets. While in the soaking methods of the prior art a mixture of two metal solutions will not deposit metals on the alumina base in the proportions of the ratio of metal concentration in the solution, a precise predetermined proportion of two different metals is readily achieved by the spraying technique. After the spraying operation the pellets are dried in an oven as described above with respect to the pellets which have been soaked in a solution of a catalyst metal salt.

*Example I*

One pound, three ounces of alumina trihydrate (Alcoa C730) having an average surface particle diameter of 0.08 microns and having a bulk density loose of 17 pounds/ft.³ and 6 pounds, 9 ounces of aluminum trihydrate (Alcoa $C_{31}$) 95% of its mass composed of particles in the range of from one micron to 50 microns in diameter and having a bulk density loose of 65 pounds/ft.³ and an average surface particle diameter of 30 microns are charged into the above described blending apparatus and thoroughly mixed. With the blender rotating, 525 cc. of the following feed solution is fed to the blender at the rate of 75 cc. per minute:

| | |
|---|---|
| Weight of 85% $H_3PO_4$ _____ gms__ | 459 |
| Weight of C-31 _____ gms__ | 101 |
| Weight of water _____ gms__ | 432 |
| Total weight _____ gms__ | 992 |
| Total $H_3PO_4$ content, percent _____ | 39.4 |
| Weight of 100% $H_3PO_4$ _____ gms__ | 390 |

The tumbling action continues for ten minutes. 125 cc. more of the aforesaid feed solution is then fed to the blender at the same rate and the tumbling is continued for ten more minutes. Quenching is then carried out by adding into the blender 600 gms. of alumina trihydrate (Alcoa $C_{31}$) and continuing the tumbling for ten more minutes.

The thus formed pellets are heated in an oven at 200° F. for one hour and then sieved to obtain the pellets having a diameter within the range of from .033" to .055". These hydrate pellets are then decomposed to catalytic activity by subjecting them to heating in an oven at a temperature of 900° F. for one hour.

The thus decomposed pallet base is then placed in a clean tumbling apparatus of the type heretofore described and tumbled while the tumbling apparatus is fed a water solution of 1.92 moles per liter of each of copper nitrate and chromium nitrate at a rate of 30 cc./lb. of base/min. for five minutes. After all of this water solution has been sprayed on the pellets, the wet pellets are transferred to a drying oven where they are exposed to the passage of air containing 0.5% propane at 800 F. until dry. On cooling the final catalyst product is ready for use.

*Example II*

One pound, three ounces of alumina trihydrate (Alcoa C730) having an average surface particle diameter of 0.08 micron and having a bulk density loose of 17 pounds/ft.³ and 6 pounds, 11.7 ounces of alumina trihydrate (Alcoa $C_{31}$) 95% of its mass composed of particles in the range of from one micron to 50 microns in diameter and having a bulk density loose of 65 pounds/ft.³ and an average surface particle diameter of 30 microns are charged into the above described blending apparatus and thoroughly mixed. With the blender rotating, 525 cc. of the following feed solution is fed to the blender at the rate of 75 cc. per minute:

| | |
|---|---|
| Weight of 85% $H_3PO_4$ _____ gms__ | 459 |
| Weight of water _____ gms__ | 533 |
| Total weight _____ gms__ | 992 |
| Total $H_3PO_4$ content, percent _____ | 39.4 |
| Weight of 100% $H_3PO_4$ _____ gms__ | 390 |

The tumbling action continues for ten minutes. 125 cc. of the aforesaid feed solution is then fed to the blender at the same rate and the tumbling is continued for ten more minutes. Quenching is then carried out by adding into the blender 600 gms. of alumina trihydrate (Alcoa $C_{31}$) and continuing the tumbling for ten more minutes.

The thus formed pellets are dried and further processed following the detailed procedure set forth in Example I.

MODIFICATION OF METHOD

The above described method advantageously can be modified to produce an exceptionally large percentage of pellets within the desired size range by the employment of seeds. The seeds which are substantially spherical and of a diameter of from .016" to about .033" and which will contain from about 8 to about 12% free water are introduced into the above discussed mixture of alumina trihydrates before the mixture is sprayed with phosphoric acid to act as nuclei or cores about which the desired pellets are formed. Best results have been obtained when the weight of the seeds used has been determined in the following equation:

Weight of seed $$= \text{weight (total) of material} \times \frac{(\text{dia. seed})^3}{(\text{dia. product desired})^3}$$

Advantageously the seeds are obtained from one of two sources. The seeds can be obtained from the fines from which the end product pellets of the above described method are separated after the oven drying step. These fines are sieved to obtain the portion having a diameter of from about .016" to about .033". Before being used, the thus obtained seeds must be wetted to have a free water content of from about 8% to about 12% by weight.

More advantageously, the seeds are prepared in a separate operation which differs only slightly from the initial steps in the above described method of making pellets in that somewhat less water is employed in the feed solution than would be employed if the end product were to be produced in a single operation. The total phosphoric acid in the phosphoric solution for making the seeds will be preferably the same as for the previously described larger balls of product sizes with concentration of $H_3PO_4$ increased and volume of solution described, proportionately. As in the case of the above discussed method, a portion of the alumina trihydrate can be dissolved advantageously in the phosphoric acid solution. To form the seeds, this phosphoric acid solution is sprayed gradually into a flowing mass, advantageously a tumbling mass of the alumina trihydrate mixture of powders as described above with respect to the making of pellets. After all the phosphoric acid solution has been sprayed and the resultant aggregates thoroughly tumbled, the seeds are quenched by dusting with a powder comprising either one or a mixture of the alumina trihydrates. The seeds are then ready to be employed after hardening by heating at a temperature in the range of from ambient to about 212° F. and sieving to obtain the desired size range of from about .016" to about .033" in diameter, and rewetting with water to about 8% to about 12% free water content.

From the above it will be appreciated that the making of the seeds in this operation is identical with the procedure for making pellets as described above with the exception that a lesser amount of water in the phosphoric acid solution is employed than would be employed if the end product were to be produced in a single operation. This procedure for obtaining seeds has been found to be particularly desirable since such seeds will have a composition which is substantially the same as the new material employed to build up the seed into a pellet. This produces a homogenous product with no differential shrinkage between the seed and the material applied to the seed. In any event, the employment of seeds results in obtaining yields of from 85 to 95% of pellets in the desired size range which is an exceptionally high yield and hence a marked contribution to the economy of the process and quality of product.

The following example is illustrative of the making and employment of the above described seeds.

*Example III*

One pound, three ounces of alumina trihydrate (Alcoa C730) having an average surface particle diameter of 0.08 micron and having a bulk density loose of 17 pounds/ft.$^3$ and six pounds, nine ounces of alumina trihydrate (Alcoa C$_{31}$) 95% of its mass composed of particles in the range of from one micron to 50 microns in diameter and having a bulk density loose of 65 pounds/ft.$^3$ and an average surface particle diameter of 30 microns are charged into the above described blending apparatus and thoroughly mixed. With the blender rotating, 575 cc. of the following feed solution is fed to the blender at the rate of 75 cc. per minute:

| | |
|---|---|
| Weight of 85% H$_3$PO$_4$ _____gms__ | 459 |
| Weight of C-31 _____gms__ | 101 |
| Weight of water _____gms__ | 355 |
| Total weight _____gms__ | 915 |
| Total H$_3$PO$_4$ content, percent _____ | 42.2 |
| Weight of 100% H$_3$PO$_4$ _____gms__ | 390 |

The tumbling action is continued for ten minutes. Quenching is then carried out by adding into the blender 600 grams of alumina trihydrate (Alcoa C$_{31}$) and continuing the tumbling for ten more minutes. The thus formed balls are hardened by heating at a temperature of 150° F. and sieved to obtain seeds in the range of .016" to .033" in diameter. The thus formed seeds are then wetted to a free water content of 10%.

812 grams of the thus formed seed balls are added to and mixed with a homogenous mixture of 700 grams of alumina trihydrate (Alcoa C730) having an average surface diameter of 0.08 micron and having a bulk density loose of 17 pounds/ft.$^3$ and 3975 grams of alumina trihydrate (Alcoa C$_{31}$), 95% of the mass composed of particles in the range of from 1 micron to 50 microns in diameter and having a bulk density loose of 65 pounds/ft.$^3$ and an average surface particle diameter of 30 microns in a blending apparatus. With the blender in operation, 1120 grams of the phosphoric acid feed solution set forth in Example I is fed to the mixture in the blender at the rate of 35 grams per minute. After all of the phosphoric acid solution has been fed, tumbling is continued for three minutes and then 500 grams of quench powder, alumina trihydrate (Alcoa C$_{31}$), is added while tumbling for three more minutes.

The steps of Example I following the quenching step, are then carried out as in Example I.

It is not desired to be limited except as set forth in the following claims.

What is claimed is:

1. The steps in the method of making substantially spherical catalyst pellets having a diameter of from about .020" to about .100" which comprises spraying a phosphoric acid solution containing from about 18% to 72% by weight of phosphoric acid into a mixture of (a) alumina trihydrate having an average surface particle diameter of less than one micron and (b) alumina trihydrate having an average surface particle diameter in the range of from 10 microns to 100 microns, the phosphoric acid in the said solution being in an amount of from about 5.7% to about 14.3% by weight of the total weight of the said mixture and the first mentioned alumina trihydrate being from about 5% to about 20% by weight of said mixture tumbling said mixture of alumina trihydrates during the spraying and subsequent thereto, quenching the thus formed substantially spherical pellets with an alumina trihydrate quenching powder, heating the pellets at a temperature in the range of from ambient to about 212° F. to harden the pellets, separating out the pellets in the range of from about .22 inch to about .11 inch and then making the thus separated pellets catalytically active by heating to decompose the Al(OH)$_3$ to a mixture of AlO(OH) and Al$_2$O$_3$.

2. The method of claim 1 characterized in that a portion of one of the alumina trihydrates is reacted with the phosphoric acid before the phosphoric acid is sprayed by premixing said portion with the phosphoric acid to form monoaluminum dihydrogen phosphate.

3. The method in accordance with claim 2 characterized in that the alumina trihydrate is present in the phosphoric acid solution in a stoichiometric amount to react all of the phosphoric acid.

4. The steps in the method of making substantially spherical catalyst pellets having a diameter of from about .020" to about .100" which comprises spraying a phosphoric acid solution containing from about 18% to 72% by weight of phosphoric acid into a mixture of (a) alumina trihydrate having an average surface particle diameter of less than one micron, (b) alumina trihydrate having an average surface particle diameter in the range of from 10 microns to 100 microns the phosphoric acid in the said solution being in an amount of from about 5.7% to about 14.3% by weight of the total weight of the said mixture and the first mentioned alumina trihydrate being from about 5% to about 20% by weight of said mixture and (c) alumina trihydrate seeds of a diameter of from about .016" to about .033" containing an aluminum phosphate binder and containing from about 8% to about 12% free water, tumbling said mixture during the spraying and subsequent thereto, quenching the thus formed substantially spherical pellets with an alumina trihydrate quenching powder, heating the pellets at a temperature in the range of from ambient to about 212° F. to harden the pellets, separating out the pellets in the range of from about .22 inch to about .11 inch and then making the thus separated pellets catalytically active by heating to decompose the Al(OH)$_3$ to a mixture of AlO(OH) and Al$_2$O$_3$.

5. The steps in the method of making substantially spherical catalyst pellets having a diameter of from about .020" to about .100" which comprises spraying a phosphoric acid solution containing from about 18% to 72% by weight of phosphoric acid into a mixture of (a) alumina trihydrate having an average surface particle diameter of less than one micron and (b) alumina trihydrate having an average surface particle diameter in the range of from 10 microns to 100 microns, the phosphoric acid in the said solution being in an amount of from about 5.7% to about 14.3% by weight of the total weight of the said mixture and the first mentioned alumina trihydrate being from about 5% to about 20% by weight of said mixture tumbling said mixture of alumina trihydrates during the spraying and subsequent thereto, quenching the thus formed substantially spherical pellets with an alumina trihydrate quenching powder, heating the pellets at a temperature in the range of from ambient to about 212° F. to harden the pellets, separating out the pellets in the range of from about .22 inch to about .11 inch and then making the thus separated pellets catalytically active by heating to decompose the Al(OH)$_3$ to a mixture of AlO(OH) and Al$_2$O$_3$, impregnating the thus prepared pellets with a plurality of catalytically active metals by spraying the pellets with a solution of salts of said metals and drying the thus sprayed pellets and subjecting them to a reducing gas to reduce the catalyst metals to elemental form, said salt solution being in a substantial amount and less than the total amount which the pellets are capable of absorbing.

6. The steps in the method of making substantially spherical alumina trihydrate-aluminum phosphate pellets having a diameter of from about .016" to about .033" which comprises spraying a phosphoric acid solution containing from about 18% to 72% by weight of phosphoric acid into a mixture of (a) alumina trihydrate having an average surface particle diameter of less than one micron and (b) alumina trihydrate having an average surface particle diameter in the range of from 10 microns to 100 microns, the phosphoric acid in the said solution being in an amount of from about 5.7% to about 14.3% by weight of the total weight of the said mixture and the first mentioned alumina trihydrate being from about 5% to about 20% by weight of said mixture tumbling said mixture of alumina trihydrates during the spraying and subsequent thereto, quenching the thus formed substantially spherical pellets with an alumina trihydrate quenching powder, heating the pellets at a temperature in the range of from ambient to about 212° F. to harden the pellets, separating out the pellets in the range of from about .22 inch to about .11 inch.

7. The method of claim 6 characterized in that a portion of one of the alumina trihydrates is reacted with the phosphoric acid before the phosphoric acid is sprayed.

References Cited by the Examiner
UNITED STATES PATENTS

| | | | |
|---|---|---|---|
| 2,330,115 | 9/43 | Drennan | 252—435 |
| 2,715,649 | 8/55 | Hammond | 252—435 |
| 2,967,185 | 1/61 | Becker et al. | 252—437 |

MAURICE A. BRINDISI, *Primary Examiner.*

JULIUS GREENWALD, *Examiner.*